Patented Nov. 11, 1930

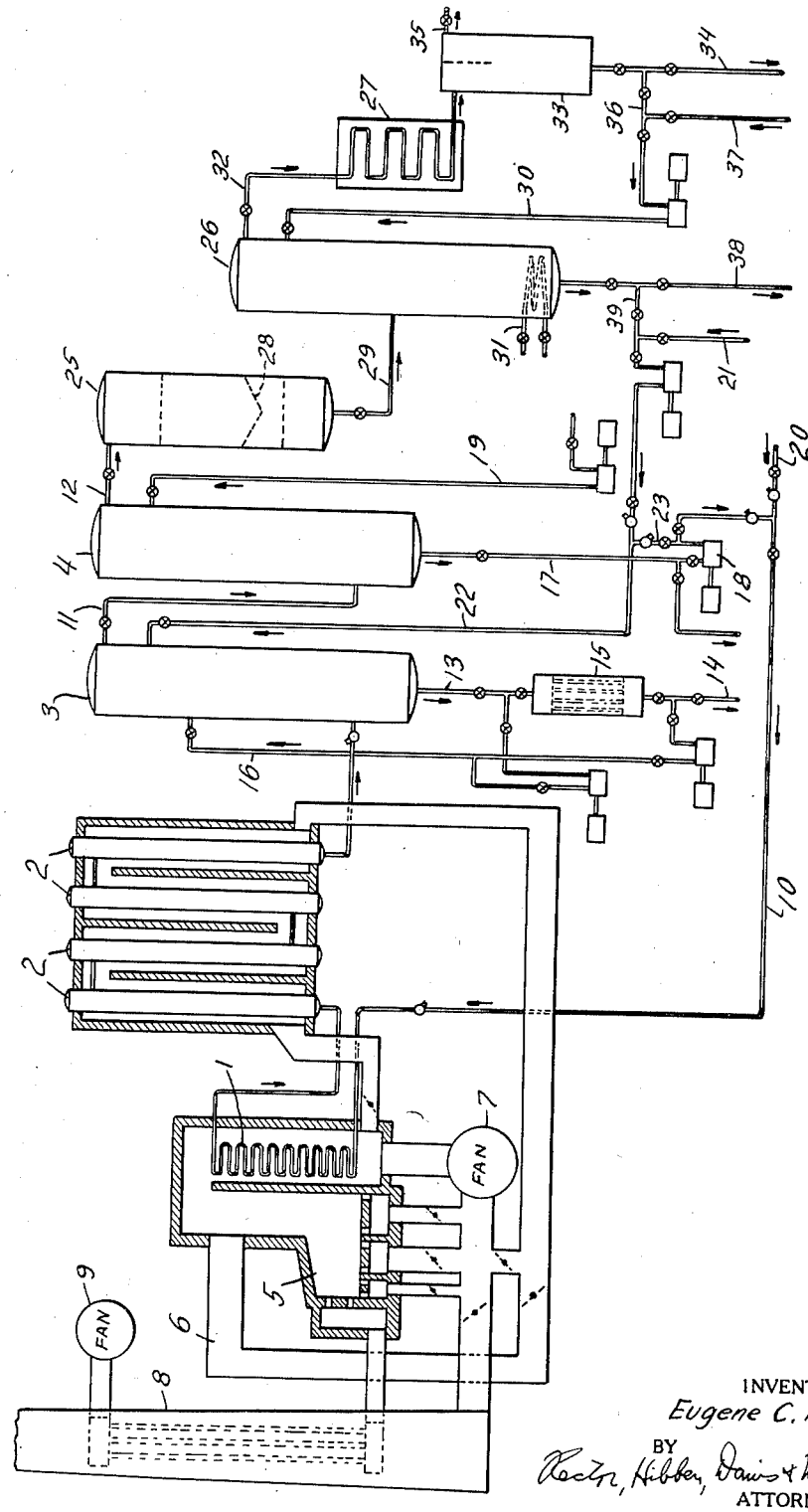

1,781,388

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

ART OF REFINING HYDROCARBONS

Application filed February 29, 1928. Serial No. 257,958.

This invention relates to improvements in refining cracked gasoline in vapor phase by passage of the gasoline vapors through an adsorptive catalyst, such as fuller's earth, causing polymerization of unsaturated constituents unsuitable as components of the refined gasoline product, where the polymers produced by the vapor-catalyst contact exceed 3% by liquid volume of the refined gasoline product after separation of such polymers.

It has hitherto been proposed to refine gasoline in vapor phase by passage of the gasoline vapors through such adsorptive catalysts, and this general method has been used with considerable success in many cases. However, unusual difficulties have been encountered in attempts to employ this general method in refining cracked gasoline containing, in the raw state, a large portion of material polymerizing on contact with the adsorptive catalyst. In those cases where this general method has been successfully employed, the proportion of polymers produced in the refining operation usually has not exceeded ½–1% by liquid volume of the gasoline product after separation of such polymers. As compared to this, the raw cracked gasoline from vapor phase cracking operations in which severe cracking conditions are maintained, for example, frequently contains unsaturated constituents reacting with the adsorptive catalyst in amounts so large that the proportion of polymers produced is as much as 10–11% by liquid volume of the gasoline product after separation of such polymers. As applied to this type of raw cracked gasoline, the refining operation must accommodate an amount of polymers ten to twenty times as great as the amount usually produced. The refining operation is usually carried out with concurrent continuous separation and discharge of the polymers produced by the vapor-catalyst contact.

According to the present invention, the raw cracked gasoline vapors are passed in vapor phase through the adsorptive catalyst and unsaturated constituents unsuitable as components of the refined gasoline product are thereby polymerized, but without separation or discharge of such polymers from the operation, the total resulting vapor mixture including such polymers is then passed through a rectifying operation in which constituents including such polymers higher boiling than suitable as components of the refined gasoline product are condensed, and the vapors escaping uncondensed from the rectifying operation are condensed to form the refined gasoline product. By maintaining continued flow of the total vapor mixture through the refining operation proper, retention of polymers or other high boiling material in or on the adsorptive catalyst, with consequent decrease in activity of the catalyst, is reduced to a minimum. When the proportion of liquefied polymers is relatively large, as where the polymers produced by the vapor-catalyst contact exceed 3% by liquid volume of the refined product after separation of such polymers, the polymers themselves exert a washing action on the adsorptive catalyst assisting in carrying through the adsorptive catalyst with the composite vapor mixture any high boiling material the retention of which in or on the adsorptive catalyst might tend to shorten its useful life. But whatever the explanation may be, an important improvement in the useful life of the catalyst is secured by the practice of this invention where the raw cracked gasoline vapors contain a relatively large proportion of constituents polymerized on contact with the adsorptive catalyst. By subsequently fractionating the total vapor mixture resulting from passage of the raw cracked gasoline vapors through the adsorptive catalyst in a separate rectifying operation, several further advantages are secured. Difficulties due to entrainment of liquefied material in vapors discharged from the refining operation proper, frequently encountered where such liquefied material is separated and discharged concurrently with passage of the vapors through the adsorptive catalyst, are avoided. Better separation of all constituents including polymers produced by the vapor-catalyst contact higher boiling than suitable as components of the refined gasoline product is also secured with consequent improvement of the product itself. The complete operation of the invention is simple, can be carried out in simple apparatus, and is easily controlled.

The invention will be further described in connection with the accompanying drawing which illustrates, diagrammatically and conventionally, apparatus comprising a refining tower, a rectifying tower and condenser, adapted for carrying out the improved process of the invention, together with a vapor phase cracking apparatus. While the invention is of special value and application in connection with the operation of vapor phase cracking apparatus of the type illustrated, it is to be understood that the invention is also useful in connection with the operation of other types of vapor phase cracking apparatus and also in connection with the operation of other types of cracking apparatus generally where the raw cracked product includes a relatively large proportion of material polymerized by contact with adsorptive catalyst such as fuller's earth.

The vapor phase cracking apparatus illustrated comprises a heating conduit 1 arranged in a heating furnace, a series of digesting drums 2, a scrubbing tower 3 for the separation of tar or the like, and a reflux tower 4. The heating furnace illustrated, to which the heating conduit 1 is arranged, comprises a fire-box 5 communicating with the upper end of the flue in which the heating conduit 1 is arranged and also with a flue 6 for circulating heating gases through chambers in which the digesting drums 2 are arranged, a fan 7 for withdrawing heating gases from this heating flue and these chambers and for recirculating part of the heating gases therethrough by means of the several branch connections shown and for discharging the balance through the stack 8. Fan 9 is provided for supplying the air required for combustion through a pre-heating heat exchanger in the stack 8. This part of the apparatus, and its operation, are described in more detail in an application filed June 13, 1927, Serial No. 198,621, by Harry L. Pelzer. In operation, raw oil, or reflux condensate, or a mixture of the two, is supplied to the heating conduit 1 through connection 10, is vaporized and the vapors superheated in the heating conduit, the vapors from the heating conduit are discharged through the digesting drums 2 to the scrubbing tower 3 in which tar and the like is separated, and the vapors from the scrubbing tower are discharged through connection 11 to the lower end of the reflux tower 4 in which constituents higher boiling than suitable as components of the desired product, or part of such high boiling constituents, are condensed, the remaining vapors escaping through connection 12. The tar separated in tower 3 is discharged through connections 13 and 14. Part of this tar, either hot or after cooling in the cooler 15, may be reintroduced into the scrubbing tower through connection 16 for effecting or controlling the scrubbing operation. Condensates separated in tower 4 are discharged through connection 15 and may be returned to the heating conduit by means of the hot oil pump 18, in whole or in part. Raw oil to be supplied to the cracking operation may be introduced into the upper end of the reflux tower 4 through connection 19 where the reflux condensate is returned from this tower to the heating conduit, or raw oil may be supplied directly to the heating conduit through connections 20 and 10, or part of the raw oil may be supplied through connection 19 and part through connection 20. Raw oil or other stock containing tarry constituents unsuitable to be circulated through the heating conduit 1 may be introduced into the upper end of the scrubbing tower 3 through connections 21 and 22 and such tarry constituents separated with the tar in the scrubbing tower, the balance of such raw oil or other stock being vaporized to escape to the tower 4 in which this stock or the heavier portions of this stock are condensed and supplied to the heating conduit through connections 17 and 10. The operation of the scrubbing tower 3 may also be effected or controlled, or in part effected or controlled, by the introduction of raw oil or other refluxing media through connection 22. Similarly, the operation of the reflux tower 4 may be effected or controlled, or in part effected or controlled, by the regulated introduction of raw oil or other suitable refluxing media through connection 19. The towers 3 and 4, for example, may be of ordinary open baffle construction.

The following example will illustrate the operation of this vapor phase cracking apparatus: Raw oil, a gas oil character stock, for example, is supplied through connection 19 at a rate sufficient to maintain the vapors escaping through connection 12 at a temperature approximating 400–450° F., and any additional raw oil required is supplied through connection 20. Reflux condensate and admixed raw oil are forced from the lower end of tower 4 through connection 17 by means of pump 18 through the heating conduit 1, together with any raw oil supplied through connection 20, entering the heating conduit at a temperature of about 400–450° F. and under a pressure in the neighborhood of 80 lbs. per square inch, for example, and being discharged therefrom at a pressure just enough above atmospheric to force the vapor mixture through the rest of the apparatus. The stream of oil is heated and vaporized and the vapors superheated to a temperature upwards of about 1100° F. as discharged from the heating conduit 1 and the vapors are discharged from the digesting drums in the lower end of the scrubbing tower 3 at a temperature of about 950–1050° F. The temperature of the vapors escaping through connection 11 from the upper end of tower 3 is maintained in the neighborhood of 500–550° F., by the circulation of tar through connection 16 or by the introduction of a refluxing medium through connection 22 or in part by each of these means. If necessary, for example, a part of the oil mixture from the lower end of tower 4 is introduced into the upper end of tower 3 through connections 23 and 22.

The apparatus for carrying out the present invention comprises more particularly the refining tower 25, the rectifying tower 26 and the condenser 27. The rectifying tower 26, for example, may be of so-called "bubble tower" construction. A foraminous partition 28 is arranged in the refining tower 25 to support a charge of an adsorptive catalyst therein.

In carrying out the invention in the apparatus illustrated, the raw cracked gasoline-containing vapor mixture from the cracking operation is supplied to the upper end of the tower 25 through connection 12, and is passed downwardly through tower 25 and through a charge of an adsorptive catalyst supported therein, and the total resulting vapor mixture including polymers produced by the vapor-catalyst contact in the refining tower is passed through connection 29 to the rectifying tower 26 into which it is introduced at an intermediate point. The adsorptive catalyst, for example, may consist of fuller's earth of 40–60 or 60–80 mesh. Connection 30 is provided for the introduction of refluxing media into the upper end of tower 26 and a steam coil 31, or other suitable heating means, is provided for supplying heat to the lower end of the tower 26. The operation of the rectifying tower is controlled to condense therein all constituents of the vapor mixture including high boiling polymers produced in the refining operation proper higher boiling than suitable as components of the refined product. The introduction of the refluxing medium used is regulated to maintain the vapors escaping through connection 32 from the upper end of tower 26 at a temperature, for example, of about 300–350° F. Suitable refluxing media for controlling this operation include particularly gasoline fractions, such as gasoline fractions to be blended with the cracked product produced in the operation or a part of the condensed refined product itself. The temperature at the lower end of the tower 26 is maintained high enough to insure maximum vaporization from the condensate of all constituents suitable as components of the refined product, for example, upwards of 400–450° F. The refining operation proper carried out in tower 25, is exothermic; the consequent tendency toward temperature increase may be counteracted by radiation from the surface of the refining tower or by the introduction of a suitable temperature controlling medium such as a gasoline fraction to be blended with the gasoline product. The vapors escaping uncondensed from the rectifying tower 26 through connection 32 are condensed in the condenser 7 arranged to discharge into the receiver 33. The refined gasoline product is discharged from the receiver 33 through connection 34. Gases and vapors remaining uncondensed are discharged from the receiver 33 through connection 35. Connection 36 is provided for return of part of the product where required for reintroduction as a refluxing medium into the tower 26. Other refluxing media may be supplied through connection 37. The condensate separated in the rectifying tower 26 may be discharged through connection 38, or this condensate, or part of it, may with advantage be introduced into the scrubbing tower 3 through connections 39 and 22 for separation in the scrubbing tower 3 of tarry constituents, and return to the cracking operation, as condensates from the lower end of tower 4, of any suitable high boiling components.

Where the condensate from the lower end of tower 26 is reintroduced into the upper end of tower 3 in the operation of the apparatus illustrated, a certain amount of hydrocarbon constituents of intermediate boiling range, boiling so low as to escape condensation in tower 4 yet so high as to be condensed in tower 26, may be maintained in cyclic circulation through the refining operation proper carried out in tower 25. In this aspect the complete operation provides for control of the refining operation itself in providing for regulation of the proportion of such constituents of intermediate boiling range in the vapor mixture passing through the adsorptive catalyst in the refining tower.

I claim:

In refining cracked gasoline in vapor phase by passage of the gasoline vapors through an adsorptive catalyst where the polymers produced by the vapor-catalyst contact exceed 3% by liquid volume of the refined gasoline product after separation of such polymers, the improvement which comprises passing the raw cracked gasoline vapors in vapor phase through the adsorptive catalyst and thereby polymerizing unsaturated constituents unsuitable as components of the refined gasoline product without separation or discharge of such polymers from the operation, then passing the total resulting vapor mixture including such polymers directly to a rectifying zone condensing constituents including polymers higher boiling than suitable as components of the refined gasoline and vaporizing light components from the condensed polymer mixture in said rectifying zone, causing the vapors introduced to said rectifying zone to pass upwardly therethrough from the point of introduction in contact with the condensates formed therein, causing the condensed polymer mixture to pass downwardly through said zone from the point of introduction in contact with vaporized constituents liberated in said rectifying zone, and condensing the vapors escaping uncondensed from the rectifying zone to form the refined gasoline product.

In testimony whereof, I have subscribed my name.

EUGENE C. HERTHEL.